United States Patent

[11] 3,575,496

[72] Inventors Samuel C. Pollock
  Rochester;
  Arthur J. Carpenter, Royal Oak, Mich.
[21] Appl. No. 732,563
[22] Filed May 28, 1968
[45] Patented Apr. 20, 1971
[73] Assignee General Motors Corporation
  Detroit, Mich.

[54] REMOTELY CONTROLLED MIRROR
  3 Claims, 3 Drawing Figs.
[52] U.S. Cl. .................................................. 350/289,
  350/6
[51] Int. Cl. ..................................................... G02b 1/08
[50] Field of Search ........................................... 350/289, 6,
  7, 288, 22, 26, 307; 200/32.3, 153.13 (Inquired);
  74/501 (M); 178/7.6

[56] References Cited
  UNITED STATES PATENTS
3,193,651 7/1965 Hawthorn ..................... 200/153.13

| | | | |
|---|---|---|---|
| 3,459,470 | 8/1969 | Hahn ............................ | 350/289 |
| 2,871,761 | 2/1959 | Snyder ......................... | 350/289 |
| 3,063,342 | 11/1962 | Zeek ............................. | 350/6 |
| 3,199,075 | 8/1965 | Simmons ...................... | 350/289X |

Primary Examiner—David Schonberg
Assistant Examiner—John W. Leonard
Attorneys—J. L. Carpenter and E. J. Biskup ABSTRACT: A remotely controlled rearview mirror for a motor vehicle characterized by having a mirror element that automatically scans a rearward field of vision. In a preferred form, the mirror element is universally connected to a post member that is rotatable about a vertical axis. The post member is operatively connected to an electric motor and a drive mechanism that imparts a harmonic oscillation to the mirror element when the motor is energized. The motor is controlled by an actuator switch located interior of the vehicle, and a control switch is operatively associated with the actuator switch and the drive mechanism for automatically deenergizing the motor a predetermined oscillatory period.

PATENTED APR 20 1971      3,575,496
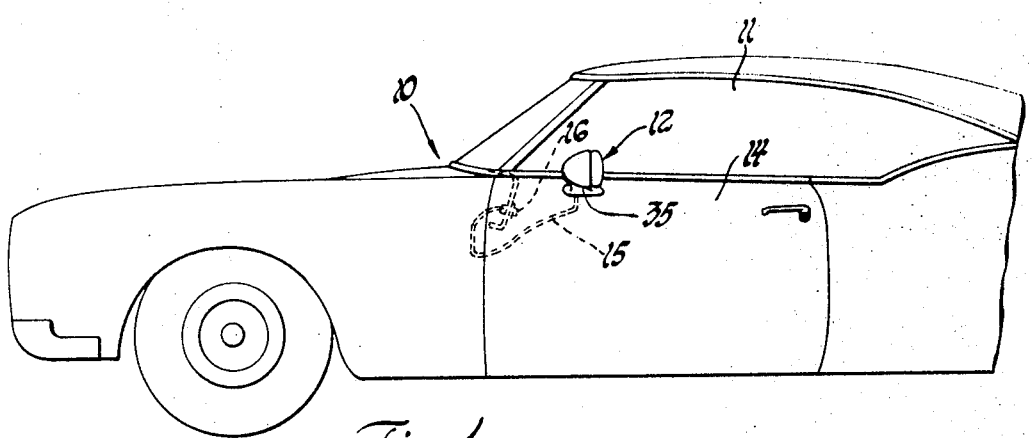
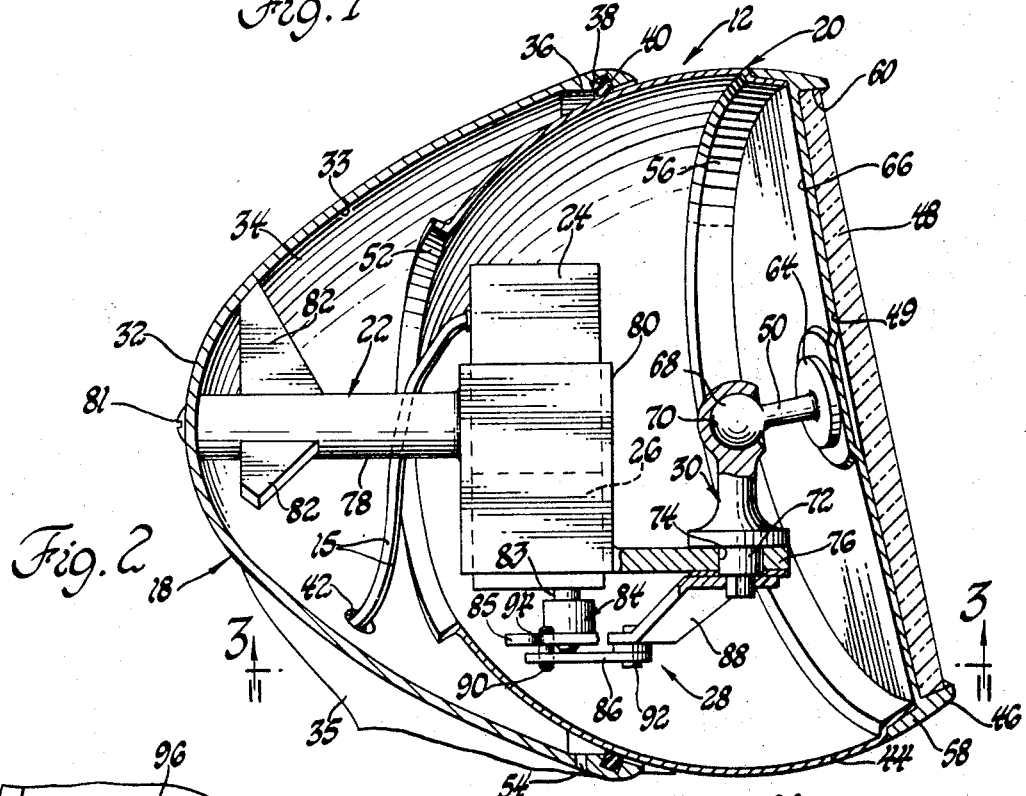
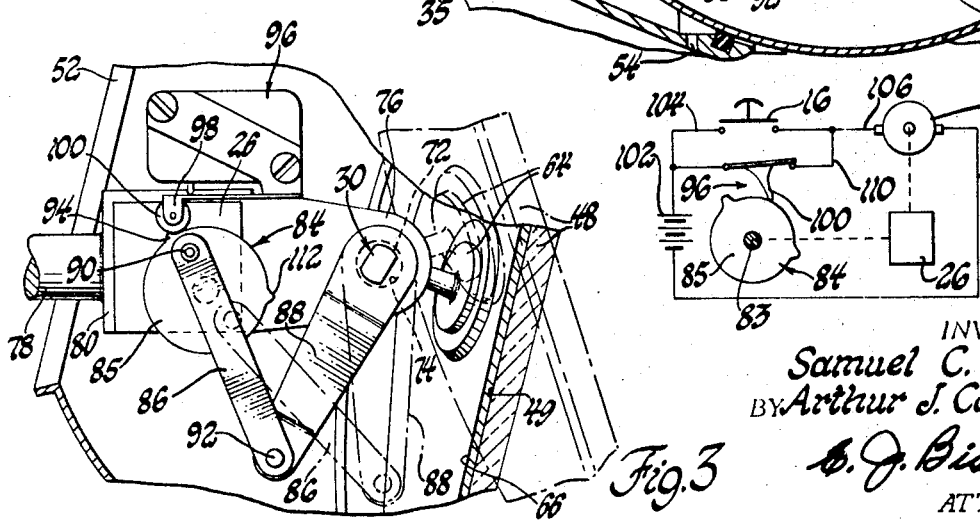
INVENTORS
Samuel C. Pollock &
BY Arthur J. Carpenter
C. J. Biskup
ATTORNEY

REMOTELY CONTROLLED MIRROR

Recognizing that a wider rearward field of vision can be achieved by oscillating the reflecting surface of a rearview mirror, numerous constructions have been proposed wherein an electric motor oscillates a mirror element about a fixed vertical axis. The principal proposals have been directed toward a continuous oscillation of the mirror during selective vehicle operating modes or a manually controlled oscillation wherein the motor remains energized only as long as a remotely located switch is held closed by the operator. However, neither of these arrangements are entirely satisfactory. For instance, the mirror elements are functionally operable only during the controlled oscillatory period inasmuch as the mirror elements come to rest at random angular positions after the motor is deenergized. Therefore, a secondary viewing surface must be provided for conventional or "normal" rear viewing. Also, the fixed-single axis of movement precludes universal adjustment of the mirror element to accommodate varying operator viewing preferences.

Some of the above-noted deficiencies can be cured by using a reversible-electrical motor. However, inasmuch as the motor must be reversed to reverse the scanning action of the mirror, a double-throw switch must be provided and, as a consequence, continuous control by the operator is required throughout the oscillatory period. Moreover, the motor must be selectively energized and deenergized to return the mirror element to the "normal" viewing position. Accordingly, a considerable degree of manual dexterity is required to adjust the mirror element to a desired viewing position.

The rearview mirror of the present construction provides a mechanism for oscillating the mirror element that is automatically deenergized after the predetermined oscillatory period, and automatically returns the mirror element to a functional "normal" viewing position. More specifically, the mirror element is universally connected to a postmember that is, in turn, rotatably supported for oscillatory movement by a support member mounted exterior of the vehicle. An electric motor is mounted on the support member and is operatively interconnected with the postmember by means of a drive mechanism. When the motor is energized by an actuator switch located interior of the vehicle, the drive mechanism imparts a harmonic oscillation to the mirror element. The harmonic motion provides a "dwell" period at the extremes of the oscillation and, consequently, a momentary stationary field of vision. A drive wheel comprising part of the drive mechanism is fixedly supported on the output shaft of the motor and includes a cam lobe that selectively engages a normally "on" limit switch. The limit switch is electrically connected in parallel with the actuator switch and after the latter has been momentarily energized maintains an electrical circuit to the motor until one oscillatory period has been completed. At that time, the cam lobe engages the limit switch and biases the latter to an open or "off" position thereby automatically deenergizing the motor when the mirror element is at the "normal" viewing position. If the operator desires a continuous scanning by the mirror element, the actuator switch is held closed thereby overriding the deenergizing effect of the limit switch. Under these conditions, the mirror element will continue to oscillate until the actuator switch is released at which time the mirror element automatically returns to the aforementioned "normal" viewing position.

Accordingly, the objects of the present invention are: to provide a remotely controlled rearview mirror wherein a mirror element is oscillated about a vertical axis for a predetermined oscillatory period and thereafter automatically returns to a "normal" viewing position; to provide an exterior remotely controlled rearview mirror wherein a motor oscillates a mirror element about a vertical axis and control means operatively associated with the motor automatically deenergizes the latter after a predetermined oscillatory period; to provide a remotely controlled rearview mirror wherein a mirror element universally connected to a postmember is oscillated by a motor, the motor being energized by a remotely located actuator and automatically deenergized after a predetermined oscillatory period by a control switch operatively connected between the motor and the actuator; and to provide a remotely controlled exterior rearview mirror wherein a mirror element is oscillated about a vertical axis by a vehicle-supported electric motor and drive mechanism, the motor being energized by a remotely located actuator and automatically deenergized after predetermined oscillatory periods by a limit switch operatively connected to the drive mechanism and electrically connected in parallel with the actuator.

These and other objects will be apparent to one skilled in the art upon reading the following detailed description, reference being made to the accompanying drawings in which:

FIG. 1 is a side elevational view of a motor vehicle incorporating a remotely controlled rearview mirror made in accordance with the present invention;

FIG. 2 is an enlarged fragmentary side cross-sectional view of the rearview mirror shown in FIG. 1;

FIG. 3 is a view taken along line 3–3 in FIG. 2; and

FIG. 4 is a schematic diagram of the control circuit for the rearview mirror shown in FIGS. 1 through 3.

Referring to FIG. 1, there is illustrated a motor vehicle 10 having an interior passenger compartment 11. A rearview mirror 12 is fixedly mounted exteriorly of the vehicle such as on a door panel 14 and is selectively adjusted to a desired position by electrical means connected by conductors 15 to an actuator switch 16 located in the passenger compartment 11.

Referring now to FIG. 2, the rearview mirror 12 comprises a fixed-support housing 18, an adjustable mirror assembly 20 and a support member 22. An electric motor 24 is drivingly connected to a gear reduction unit 26 and both are mounted on the support member 22 interior of the support housing 18 and mirror assembly 20. A drive mechanism, generally indicated by reference numeral 28, is operatively connected at one end to the gear reduction unit 26 and at the other end to a rotatable postmember 30. The postmember 30, in turn, universally supports the mirror assembly 20.

The support housing 18 includes a shell 32 having an inwardly facing surface 33 defining a rearwardly opening cavity 34. A mounting bracket 35, partially illustrated, is formed integrally with the lower portion of the shell 32 and is adapted to be conventionally fastened to the door panel 14. The inwardly facing surface 33 of the shell 32 terminates at an enlarged annular rim 36. An inwardly facing circumferential groove 38 is formed in the rim 36 and serves to locate and retain an annular sealing member 40. The sealing member 40 is formed of a low-friction material such as silicone rubber and seals the space between shell 32 and the mirror assembly 20. An aperture 42 is formed in the shell 32 and the conductors 15 extend therethrough between the motor 24 and the actuator switch 16.

The mirror assembly 20 comprises a truncated spherical shell 44, an annular retaining cap 46, a mirror element 48 having a reflecting surface 49 and a ball stud 50. The rearward end of the shell 44 terminates with an outwardly flared annular rim 52 so any moisture leaking past the sealing element 40 will be directed circumferentially downward by the rim 52 and will exhaust through a drain hole 54 formed in the lower portion of the shell 32 adjacent the rim 36. The forward edge of the shell 44 terminates with a radially inwardly stepped conical flange 56 to which a rearwardly extending conical rim 58 of the retaining cap 46 is secured. A cylindrical recess 60 formed in the front surface of the retaining cap 46 receives and retains the mirror element 48.

The ball stud 50 comprises a flared end 64 spot welded to the rear surface 66 of the retaining cap 46 and a spherical ball 68 frictionally and adjustably received within a spherical socket 70 formed in the postmember 30. Thus, it will be appreciated that the mirror element 48 can be universally positioned with respect to the postmember 30 to fully accommodate operator viewing angle preferences. The postmember 30 is provided with a reduced lower portion 72 that is rotatably supported within a bore 74 formed in a base section 76 of the support member 22. The bore 74 is vertically disposed such that the postmember 30 and the mirror element 48 are rotatably supported for oscillation about a vertical axis.

The support member 22, in addition to having the aforementioned base section 76, includes a cylindrical rear section 78 and a U-shaped intermediate channel section 80 which fixedly supports the motor 24 and the gear reduction unit 26. A plurality of radially disposed legs 82 are formed on the rear section 78 and, in assembly, the legs 82 engage the inner surface 33 of the shell 32 and are securely held in engagement therewith by means of a threaded fastener 81. Thus, it will be noted that the support member 22, the motor 24 including the gear reduction unit 26, the drive mechanism 28 and the mirror assembly 20 are fixedly secured as a unit to the support housing 18 by a single fastener.

The electric motor 24 is preferably a permanent magnet direct current motor that may be selected from numerous commercially available models. The details of the gear reduction unit 26 are not shown except for the output shaft 83 but it will be understood that in the preferred form, the unit should provide a high reduction ratio such as achieved by planetary gearing. As with the motor, the gear reduction unit 26 can be selected from a variety of commercially available models. In the preferred form, it is desired that the speed of the output shaft 83 range between 20 to 40 revolutions per minute. Accordingly, the motor 24 and the gear reduction unit 26 should be selected to provide this result.

The drive mechanism 28 comprises a drive wheel 84 having an annular flange 85, a link 86 and a crank 88. The drive wheel 84 is fixedly connected to the output shaft 83 while the link 86 has one end pivotally and eccentrically connected to the flange 85 by pin connection 90 and the other end pivotally connected to one end of the crank 88 by pin connection 92. The other end of the crank 88 is fixedly connected to the lower end of the postmember 30.

Referring to FIG. 3, the outer periphery of the flange 85 is provided with cam lobe 94. A normally "on" limit switch 96 is fixedly mounted on the channel section 80 and includes a spring contact 98 rotatably supporting a roller 100 at one end thereof. As will be apparent, when the roller 100 engages the cam lobe 94, the limit switch 96 is shifted to an electrically "off" position.

Referring to FIG. 4, a control circuit for the rearview mirror 12 is schematically illustrated. More specifically, the control circuit comprises an electrical power source 102 electrically connected in series with the actuator switch 16 and the motor 24 by conductors 104, 106 and 108. The limit switch 96 is electrically connected in parallel with the actuator switch 16 by conductor 110, and as previously stated, the limit switch 96 is in a normally "on" or closed position.

Referring jointly to FIGS. 3 and 4, when the actuator switch 16 is momentarily closed, the motor 24 is energized and the drive wheel 84 is rotated in a clockwise direction causing the roller 100 to pass over the cam lobe 94. Thereafter, the roller 100 rides along outer periphery of flange 85 and the switch 96 returns to the electrically "on" position. Thus, after the roller 100 has passed over the cam lobe 94, the actuator switch 16 can be released and the motor 24 and drive wheel 84 will continue to rotate for a complete cycle until the circuit to the motor is interrupted by the cam lobe 94 engaging the roller 100.

As the motor 24 is energized, the wheel 84 drives the link 86 thereby initially rotating the crank 88 in a counterclockwise direction until the link reaches the phantom line position after which the crank is rotated in a clockwise direction. As a result, the postmember 30 and the mirror element 48 will be harmonically oscillated between the extreme positions indicated by the solid and the phantom lines. In the event that the operator desires a continuous oscillation of the mirror element 48, the actuator switch 16 is held closed thereby overriding the interrupting effect of the limit switch 96. After a desired oscillatory period, the actuator switch 16 is released and the mirror element 48 automatically returns to the "normal" viewing position when the cam lobe 94 engages the roller 100.

As shown in phantom lines in FIG. 3, a second cam lobe 112 can be provided on the flange 85 at a predetermined angular distance from the first cam lobe 94. This arrangement provides a second automatic dwelling position for the mirror element 48. With regard to this feature, it has been found that a 12° angular rotation of the mirror element 48 from the "normal" viewing position will provide an arrangement that is particularly useful in entering an expressway from a merging lane and will enable the occupant to comprehensively view the traffic pattern to the rear in the area of the lane to his immediate left. In operation of this embodiment, the actuator switch 16 is momentarily depressed and, thereafter, the motor 24 rotates the drive mechanism 28 and oscillates the mirror element 48 until it is automatically deenergized by cam lobe 112 engaging roller 100. To return the mirror element 48 to the "normal" position, the actuator 16 is again momentarily depressed to reenergize the motor 24 until the latter is automatically deenergized by the cam lobe 94 engaging the roller 100.

Although only one form of this invention has been shown and described, other forms will be readily apparent to those skilled in the art. Therefore, it is not intended to limit the scope of this invention by the embodiments selected for the purpose of this disclosure but only by the claims which follow.

We claim:

1. An exterior remotely controlled rearview mirror for automatically scanning a field of view rearward of a motor vehicle, comprising: a housing adapted to be fixedly connected to the motor vehicle and having an open ended cavity formed therein; a support member secured within the cavity to the housing by a single fastener; and a postmember rotatably supported by the support member for oscillatory movement about a vertical axis; a mirror assembly including a mirror element having a reflective surface universally connected to the postmember; sealing means for preventing fluid leakage into the cavity, said sealing means retained within a circumferential groove formed in the housing and sealingly engaging an outwardly facing surface of the mirror assembly; a drive mechanism including cam means formed on a rotatable portion thereof; an electric motor and a gear reduction unit mounted on the support member and operatively connected to the postmember through said drive mechanism, said cam means on the drive mechanism providing harmonic oscillatory movement of the postmember and the mirror assembly when said motor is energized; actuator means remotely located interior of the vehicle for selectively energizing the motor; and normally closed switch means electrically connected in parallel with the actuator means and engageable with the cam means to deenergize the motor when the reflective surface is at a predetermined viewing position whereby the mirror element rotates for a predetermined oscillatory period after the motor is energized by the actuator means and thereafter automatically returns to said predetermined viewing position.

2. A remotely controlled rearview mirror for automatically scanning a field of view rearward of a motor vehicle and selectively presenting a fixed field of view at a predetermined intermediate position, comprising: a housing attached to the vehicle; a mirror element supported by said housing for oscillation about the vertical axis between a normal viewing position and an extreme angularly displaced viewing position so as to provide a scanning view to the rear of the vehicle; an electric motor; actuator means remotely located interior of the vehicle for selectively energizing the motor; drive mechanism including cam means formed on a rotatable portion thereof; linkage and crank means connected between said cam means and said mirror element for imparting, upon energization of said motor, a harmonic oscillation to the mirror element, said harmonic oscillation including a dwell period at said extreme angularly displaced viewing position so as to present thereat a momentary stationary field of vision; and switch means operated by said drive mechanism for maintaining an electric circuit to the motor for at least one oscillatory period and for deenergizing said electric motor and providing automatic termination of said harmonic oscillation when said mirror returns to said normal viewing position.

3. A remotely controlled rearview mirror for automatically scanning a field of view rearward of a motor vehicle and selectively presenting a fixed field of view at a predetermined intermediate position, comprising: a housing adapted to be attached to the vehicle; a mirror element supported by said housing for oscillation about the vertical axis between a normal viewing position and an extreme angularly displaced viewing position so as to provide a scanning view to the rear of the vehicle; an electric motor; drive mechanism including cam means formed on a rotatable portion thereof; said drive mechanism connected between the motor and the mirror element for imparting upon energization of said motor, an oscillation to the mirror element about said vertical axis; actuator means remotely located interior of the vehicle for selectively energizing the motor; and means including switch means and second cam means operated by the drive mechanism for automatically deenergizing said motor at said intermediate position and said normal viewing position whereby the mirror automatically oscillates from one said viewing position to the other upon operation of said actuator means.